(12) United States Patent
Brayman et al.

(10) Patent No.: US 8,196,737 B2
(45) Date of Patent: Jun. 12, 2012

(54) BELT CONVEYOR AND METHOD

(75) Inventors: Matthew T. Brayman, Ada, MI (US);
John M. Karas, Grand Rapids, MI (US);
David H. Cotter, Coopersville, MI (US)

(73) Assignee: Dematic Corp., Grand Rapids, MI (US)

( * ) Notice: Subject to any disclaimer, the term of this patent is extended or adjusted under 35 U.S.C. 154(b) by 210 days.

(21) Appl. No.: 12/789,064

(22) Filed: May 27, 2010

(65) Prior Publication Data
US 2010/0243412 A1 Sep. 30, 2010

Related U.S. Application Data

(62) Division of application No. 11/859,407, filed on Sep. 21, 2007, now Pat. No. 7,806,254.

(60) Provisional application No. 60/826,788, filed on Sep. 25, 2006.

(51) Int. Cl.
*B65G 23/00* (2006.01)
*B65G 23/14* (2006.01)
*B65G 23/04* (2006.01)
*B65G 21/00* (2006.01)
*B65G 41/00* (2006.01)
*B65G 23/44* (2006.01)
*B65G 47/31* (2006.01)

(52) U.S. Cl. ..... 198/832; 198/833; 198/835; 198/861.1; 198/813; 198/461.1; 198/461.2

(58) Field of Classification Search ........... 198/832, 198/833, 835, 861.1, 461.1, 461.2
See application file for complete search history.

(56) References Cited

U.S. PATENT DOCUMENTS

| 3,456,776 | A | * | 7/1969 | Viene | 198/813 |
|---|---|---|---|---|---|
| 3,878,937 | A | | 4/1975 | Glaser et al. | |
| 5,058,727 | A | | 10/1991 | Jahns et al. | |
| 5,174,435 | A | | 12/1992 | Dorner et al. | |
| 5,427,228 | A | | 6/1995 | Delsanto | |
| 6,234,292 | B1 | | 5/2001 | Schut | |
| 6,513,641 | B1 | | 2/2003 | Affaticati et al. | |
| 6,523,678 | B2 | * | 2/2003 | Roessler et al. | 198/835 |
| 6,619,473 | B2 | | 9/2003 | Romeo | |
| 6,705,433 | B2 | | 3/2004 | McQuaid et al. | |
| 6,708,813 | B2 | | 3/2004 | Takahashi | |

(Continued)

FOREIGN PATENT DOCUMENTS

EP 0818406 A1 1/1998

(Continued)

*Primary Examiner* — Gene Crawford
*Assistant Examiner* — Yolanda Cumbess
(74) *Attorney, Agent, or Firm* — Gardner, Linn, Burkhart & Flory, LLP

(57) ABSTRACT

A method of replacing a continuous belt on a belt conveyor having a frame assembly includes providing a removable belt module with a removable belt module frame, the removable belt module frame having at one end a rotatably mounted drive pulley and having at an opposite end a rotatably mounted other pulley. The continuous belt is reeved around the drive pulley and the other pulley. The removable belt module is removed from at least one attachment surface of the frame assembly while the continuous belt remains under tension. A replacement removable belt module is then placed at the attachment surface. Optionally, the continuous belt has a low modulus characteristic, and the removable belt module may include at least one pivot arm for mounting at least one of the drive pulley and the other pulley to the removable belt module frame.

19 Claims, 10 Drawing Sheets

U.S. PATENT DOCUMENTS

| | | |
|---|---|---|
| 6,715,598 B2 | 4/2004 | Affaticati et al. |
| 6,860,383 B2 | 3/2005 | Veit et al. |
| 6,918,484 B2 | 7/2005 | Affaticati et al. |
| 7,093,709 B2 | 8/2006 | Cotter et al. |
| 7,121,398 B2 | 10/2006 | Affaticati et al. |
| 7,124,876 B2 | 10/2006 | Wolf |
| 7,467,708 B2 | 12/2008 | McGettigan |
| 7,556,144 B2 | 7/2009 | Cotter et al. |
| 7,562,760 B2 | 7/2009 | Affaticati et al. |
| 2007/0034478 A1 | 2/2007 | Wolf |
| 2007/0187211 A1 | 8/2007 | Vertogen et al. |

FOREIGN PATENT DOCUMENTS

| | | |
|---|---|---|
| EP | 1584580 A1 | 10/2005 |
| EP | 1607349 A1 | 12/2005 |

* cited by examiner

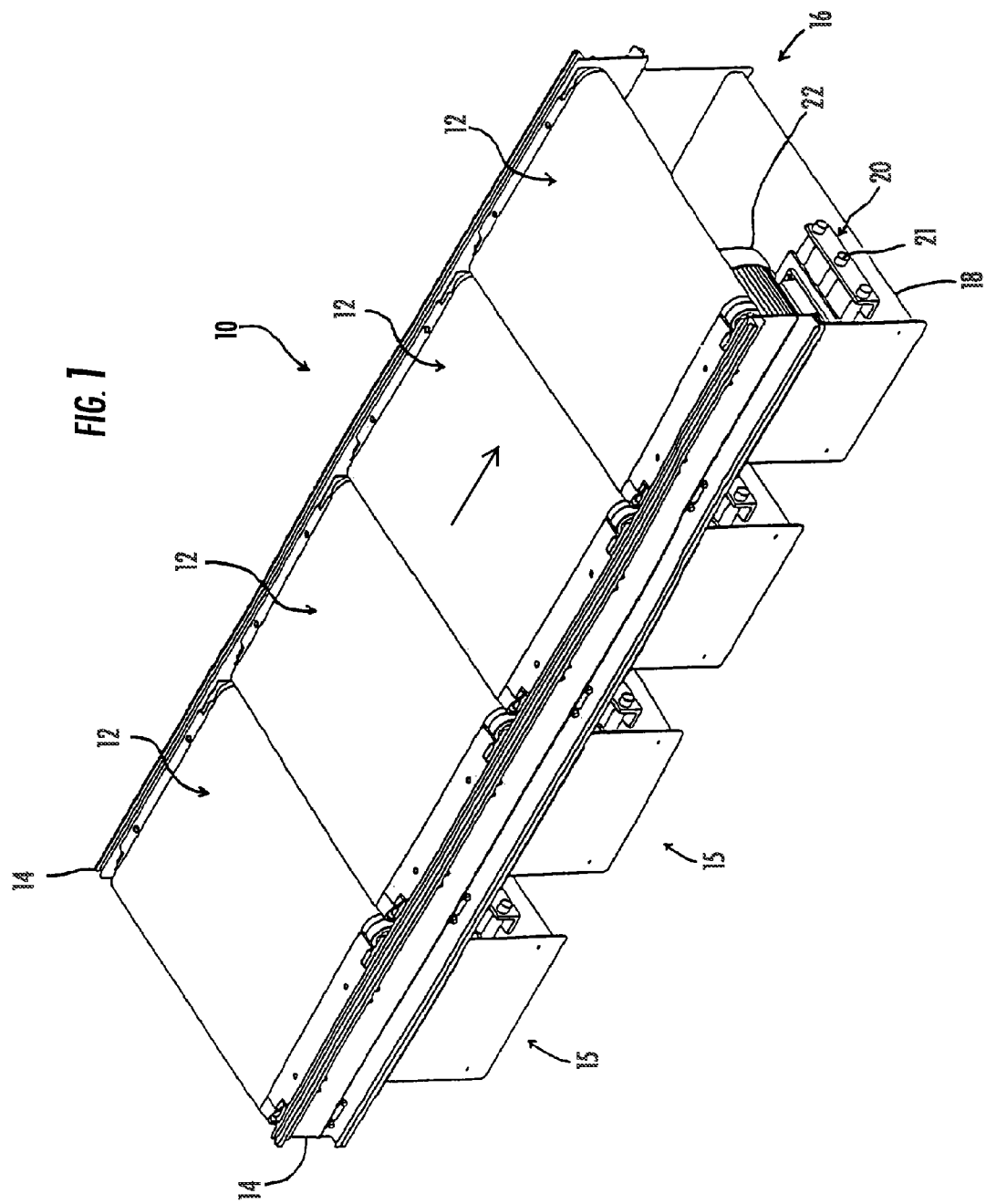

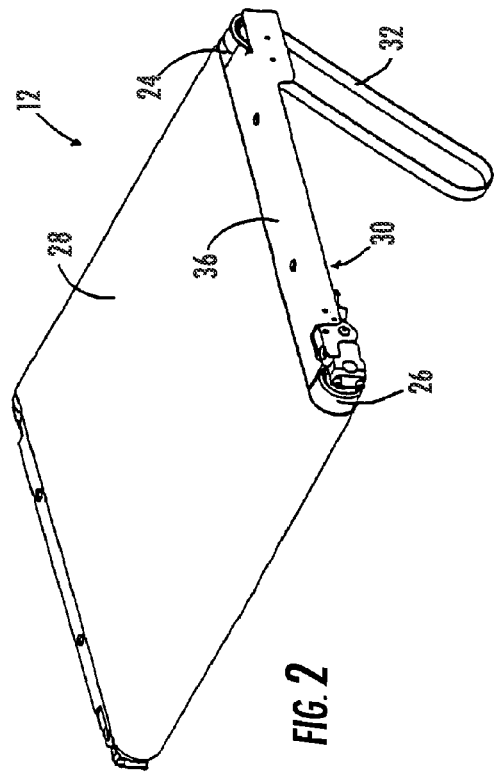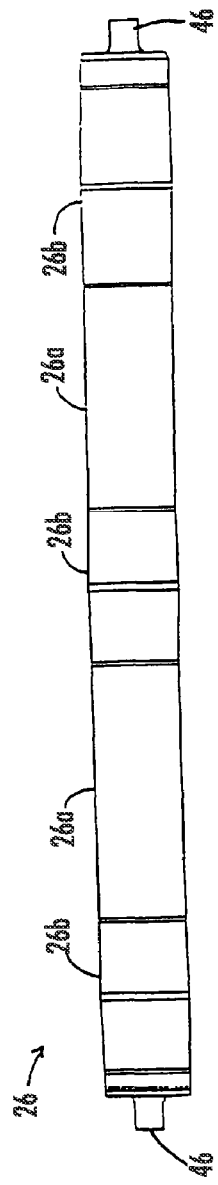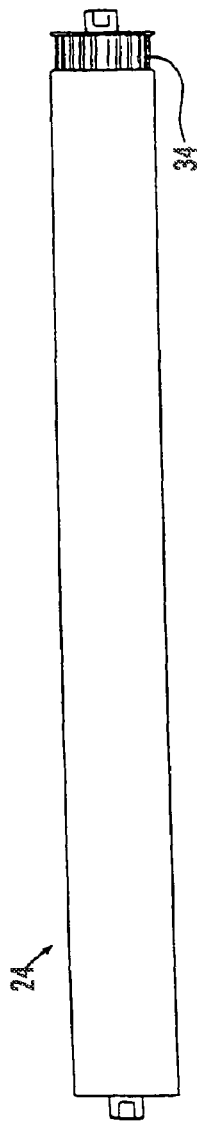

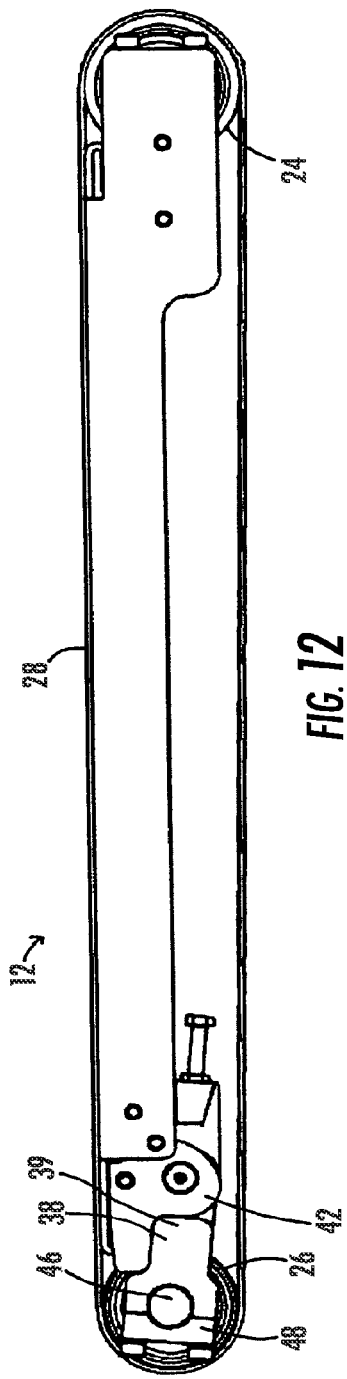
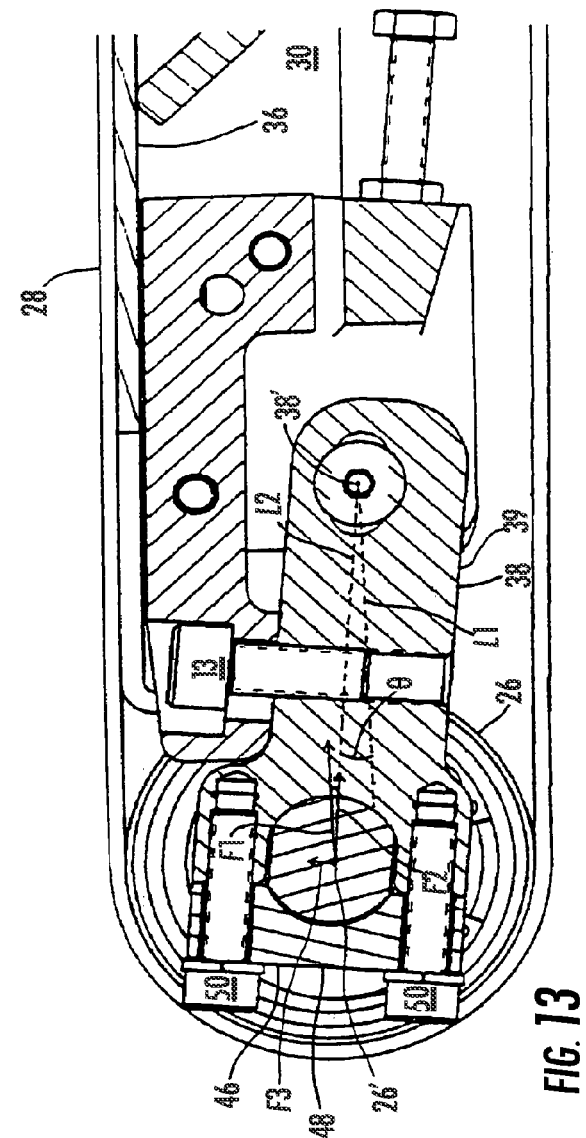
FIG. 12
FIG. 13

BELT CONVEYOR AND METHOD

CROSS REFERENCE TO RELATED APPLICATIONS

The present application is a divisional of U.S. patent application Ser. No. 11/859,407, filed Sep. 21, 2007, which claims the benefit of U.S. provisional application Ser. No. 60/826,788, filed Sep. 25, 2006, both of which are hereby incorporated herein by reference in their entireties.

FIELD OF THE INVENTION

The present invention relates generally to material handling conveyors and, more particularly, to belt conveyors.

BACKGROUND OF THE INVENTION

It is known to provide zones of belts along a belt conveyor, where each zone consists of a zone assembly that includes a powered roller and at least one additional roller, such as and idler or freely rotating roller, having a continuous belt reeved around the rollers. However, typical belt conveyors require extensive disassembly to perform maintenance tasks such as replacing a belt, replacing a roller, lubricating bearings, or the like, rendering the entire belt conveyor unusable while maintenance is performed.

SUMMARY OF THE INVENTION

The present invention provides a belt conveyor, removable belt module, and method of replacing a continuous belt in which the belt may be rapidly replaced.

According to one aspect of the present invention, a removable belt module is provided for use with a conveyor having a frame assembly and a stationary motor mounted to the frame assembly. The removable belt module includes a removable belt module frame, a drive pulley, at least one other pulley, a continuous belt, and a power transmission device. The removable belt module frame is supportable at the frame assembly of the conveyor. The drive pulley and other pulley are each rotatably mounted at the removable belt module frame. A continuous belt is reeved around the drive pulley and the other pulley. The power transmission device interconnects the drive pulley with the motor to drive the continuous belt.

According to another aspect of the present invention, a belt conveyor includes a frame assembly supporting at least one zone assembly that includes a removable belt module. The removable belt module has a removable belt module frame, a drive pulley, at least one other pulley, and a continuous belt. The drive pulley and other pulley are rotatably supported by the removable belt module frame. The continuous belt is reeved around the drive pulley and the other pulley. The removable belt module is vertically separable from the zone assembly in order to facilitate the replacement of the removable belt module and/or the continuous belt.

Thus, the continuous belt may be replaced according to a method whereby the removable belt module is removed from the frame assembly in a substantially vertical direction and a replacement removable belt module is positioned at the frame assembly in a substantially vertical direction.

According to yet another aspect of the present invention, a belt conveyor includes a frame assembly having opposite sidewalls, a drive pulley, at least one other pulley, a continuous belt, and at least one pivot arm. The drive pulley and the other pulley are rotatably mounted at the frame assembly between the opposite sidewalls. The continuous belt is reeved around the drive pulley and the other pulley. The drive pulley, the other pulley, or both the drive pulley and the other pulley are rotatably mounted to the frame assembly by the pivot arm. The pivot arm pivots from an operating position to a maintenance position to move the drive pulley and the other pulley closer together to facilitate replacement of the belt. The pivot arm pivots from the maintenance position to the operating position to place tension on the belt when the pivot arm is in the operating position. Thus, the continuous belt may be replaced according to a method whereby the pivot arm is moved away from the operating position such that said pulleys release said belt tension, the continuous belt is removed from the drive pulley and the other pulley, a replacement continuous belt is reeved around the drive pulley and the other pulley, and the pivot arm is moved back to the operating position such that the pulleys impart tension to the replacement continuous belt.

According to still other aspects, any of the above aspects of the present invention may include one or more fasteners for connecting the removable belt module to a conveyor. The fasteners may be accessible from the top or side of the conveyor. The electric motor may be adjustably supported by the frame assembly and further attached to the drive pulley via a rotary power transmission device such as a cog belt, a v-belt, a chain, a driveshaft, a gear train, or the like. Where the electric motor is adjustably supported, a mechanism such as a jackscrew may be provided for adjusting the position of the motor to aid in removing the rotary power transmission device from the powered roller. The drive pulley may, alternatively, be driven by a combustion engine, a hydraulic or pneumatic motor, or like source of rotary power. The drive pulley may also be a self-driven motorized pulley. At least one of the drive pulley at one end of a given zone assembly, and the at least one other pulley at the opposite end of the zone assembly, may include a plurality of tracking devices operable to track the continuous belt that is reeved around the drive pulley and the at least one other pulley. These devices may comprise strips or crowns around the respective pulleys. A fastener such as a bolt, a latch, or other device may be used to fix the pivot arms in the operating position.

According to further aspects, the continuous belt may comprise a low modulus characteristic of the type disclosed in commonly assigned U.S. Pat. No. 6,811,018, which is hereby incorporated herein by reference. The use of a low modulus characteristic continuous belt as a conveying surface facilitates the use of an over-center pivot arm by allowing approximately 0.75% or more stretch to the continuous belt during movement of the pivot arms from a slack or maintenance position to the operating position. The drive roller may be lagged to create a high-friction interface between the drive roller and the continuous belt. The continuous belt may have a width that spans substantially across the space between the sidewalls of the conveyor frame assembly. Attachment surfaces, such as mounting blocks, may be provided at the frame assembly for supporting the removable belt module. Two or more zone assemblies or removable belt modules may be arranged in tandem to provide an elongated conveyor. A slider plate may be provided between the drive roller and the other roller to support the continuous belt therebetween. Alternatively, one or more additional rollers may be provided between the drive roller and the other roller to support the continuous belt.

Therefore, the present invention provides a conveyor having one or more removable belt modules that are readily removed or replaced at the conveyor. The removable belt module may include a pulley mounted via a pivot arm that is pivotable between an operating position and a maintenance position to facilitate the removal or replacement of a continuous belt at the module.

These and other objects, advantages, purposes and features of the present invention will become apparent upon review of the following specification in conjunction with the drawings.

BRIEF DESCRIPTION OF THE DRAWINGS

FIG. 1 is a perspective view of a multi-zone belt conveyor in accordance with an embodiment of the present invention;

FIG. 2 is a perspective view of a removable belt module;

FIG. 3A is an end elevation of a tracking pulley useful with the present invention;

FIG. 3B is an end elevation of a drive pulley useful with the present invention;

FIG. 12 is a side elevation of the removable belt module in FIG. 2 with the rotary power transmission device removed; and FIG. 13 is an enlarged partial cutaway side elevation view of the area designated XIII in FIG. 6.

DESCRIPTION OF THE PREFERRED EMBODIMENTS

Figure 4:
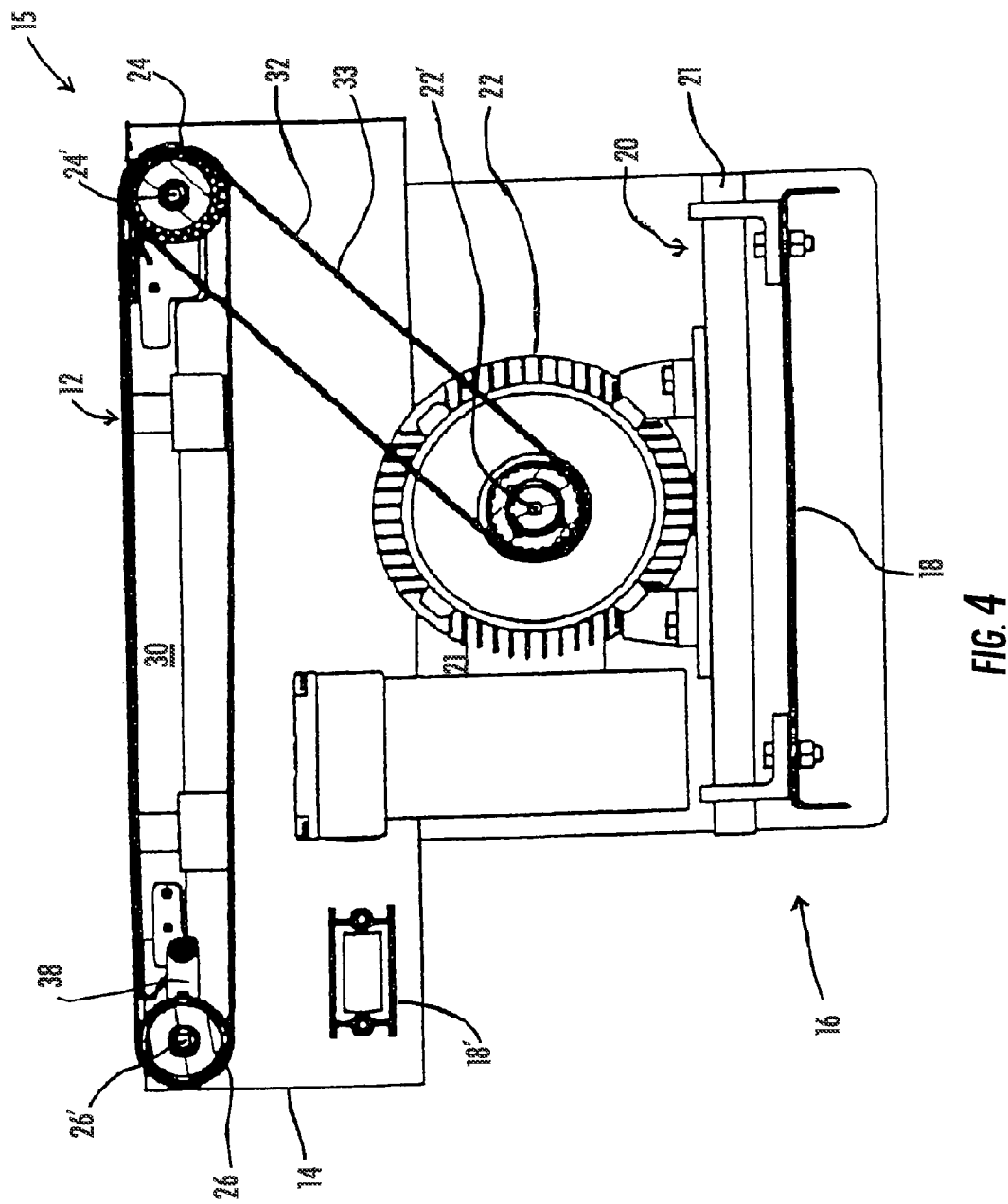
FIG. 4 is a cutaway side elevation of a single zone assembly and portions of a frame assembly.

Referring now to the drawings and the illustrative embodiments depicted therein, a belt conveyor 10 includes a frame assembly 16 supporting at least one zone assembly 15 (FIGS. 1 and 4). Frame assembly 16 may include opposite sidewalls or side frames 14 and cross members 18, 18' (FIGS. 1, 4, and 7), and may be supported from the floor or a platform, such as by frame legs (not shown), or by other structures such as wall-mount brackets, or chains, cables, or rods suspended from a ceiling (not shown). Zone assembly 15 includes a removable belt module 12, a portion of sidewalls 14, a rotary power transmission device 32, a motor 22, and an adjustment mechanism 20. Removable belt module 12 is positioned between sidewalls 14, and is operable to convey articles in a direction of conveyance illustrated by the arrow (FIG. 1). In one embodiment, each removable belt module 12 includes a powered roller or drive pulley 24 and at least one other roller or pulley 26, such as an idler pulley (shown) or another drive pulley, with a continuous belt 28 routed or reeved around pulleys 24, 26 (FIG. 2).

Removable belt module 12 includes a removable belt module frame 30 having drive pulley 24 rotatably supported at one end and other pulley 26 rotatably supported at the other end (FIGS. 2, 4, 6, 7, and 13). In the embodiments shown, a slider plate 36 spans substantially the length of removable belt module frame 30 and lies just underneath and in sliding support of continuous belt 28 in the space between drive pulley 24 and other pulley 26. In an alternate embodiment, slider plate 36 may be replaced by at least one spaced apart support pulley (not shown). In the embodiment depicted in FIG. 4, other pulley 26 is rotatably supported at removable belt module frame 30 by way of a pivot arm 38, such as an over-center pivot arm 39, as will be described in greater detail below.

Figure 6:
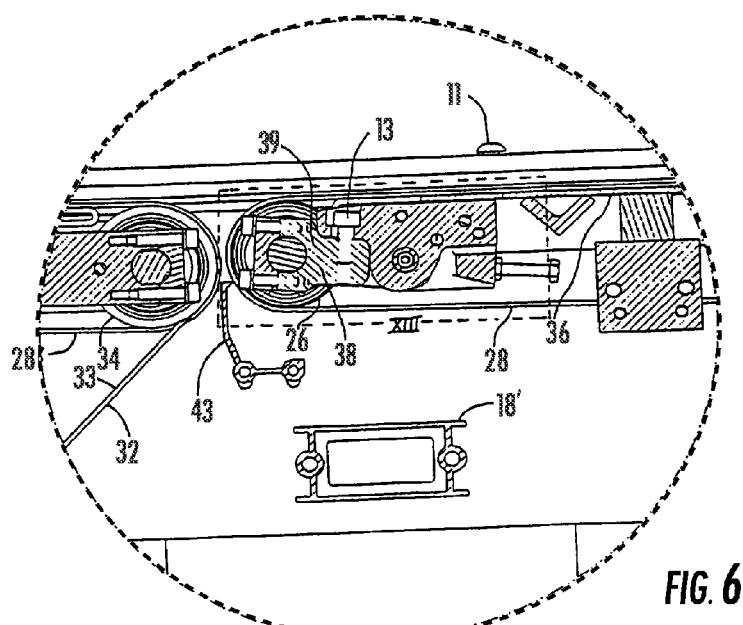
FIG. 6 is a cutaway partial side elevation of an interface between adjacent zone assemblies.
Figure 7:
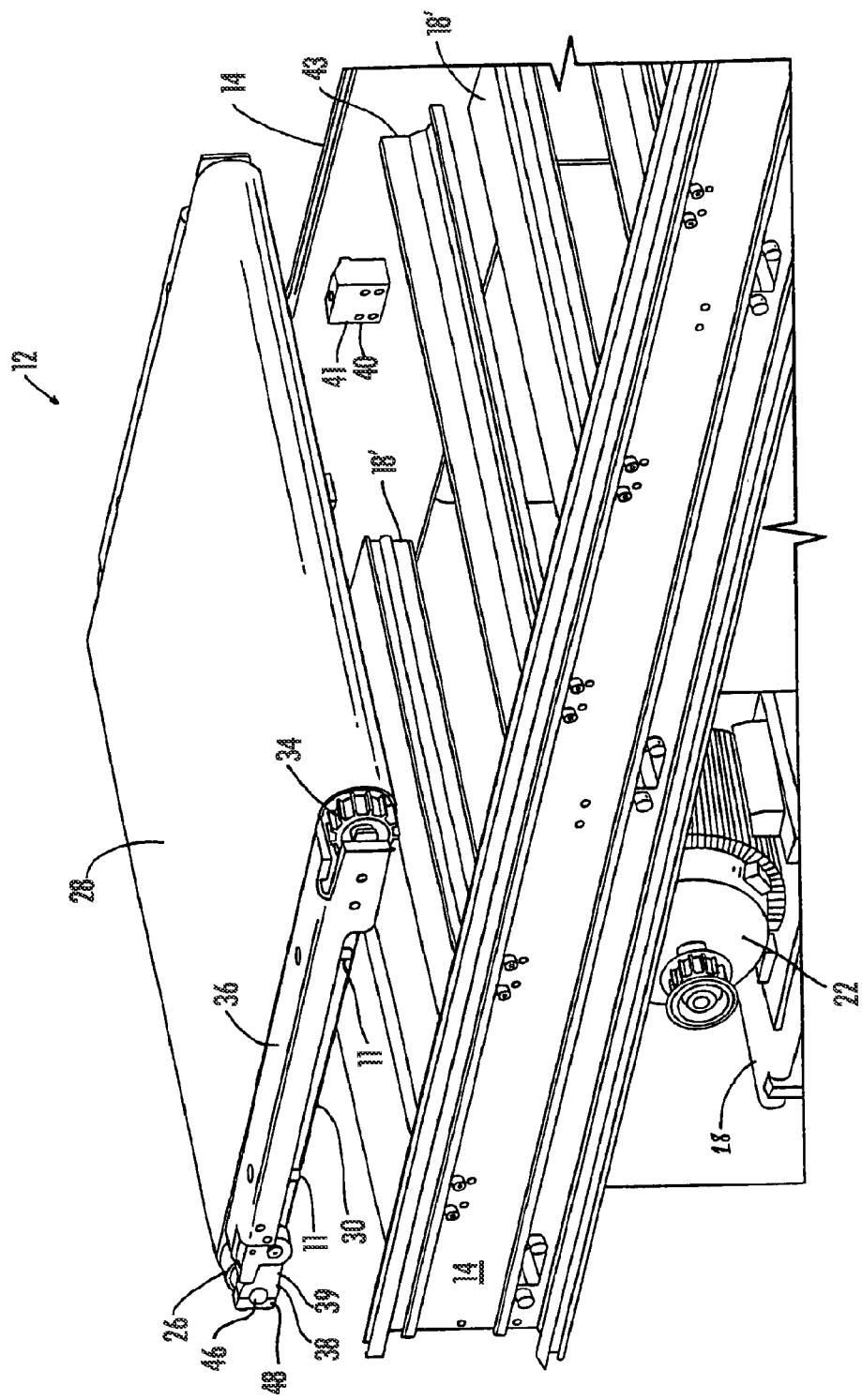
FIG. 7 is a perspective view of the belt conveyor in FIG. 1 taken from the top and side thereof.

Removable belt module 12 is removably supported by frame 16 between sidewalls 14 at one or more attachment surfaces 40 (see FIGS. 1, 7, 8, and 10). Attachment surfaces 40 can be mounting blocks 41 supported by sidewall 14 (FIGS. 8 and 11), though any attachment surface designed to interface with removable belt module 12 can suffice. Fasteners 11 may be used to temporarily attach removable belt module 12 to attachment surfaces 40 (see FIGS. 6 and 8). Fasteners 11 are readily accessible, such as from the top or side of the belt conveyor 10, and may include at least one of threaded bolts (shown), latches, pins, tabs and slots, magnets, interference fit, or the like. Module 12 may be removed from frame 16 by raising or lowering module 12, such as in a substantially vertical direction, after removing or disengaging fasteners 11, for example. A plurality of removable belt modules 12 and zone assemblies 15 may be arranged in series to form an elongated conveying or buffering or gapping surface (FIGS. 1 and 6). Where two or more removable belt modules 12 are arranged in series, a finger guard 43 may be installed at side walls 14 between adjacent belt modules 12 (FIGS. 6 and 7).

Figure 5:
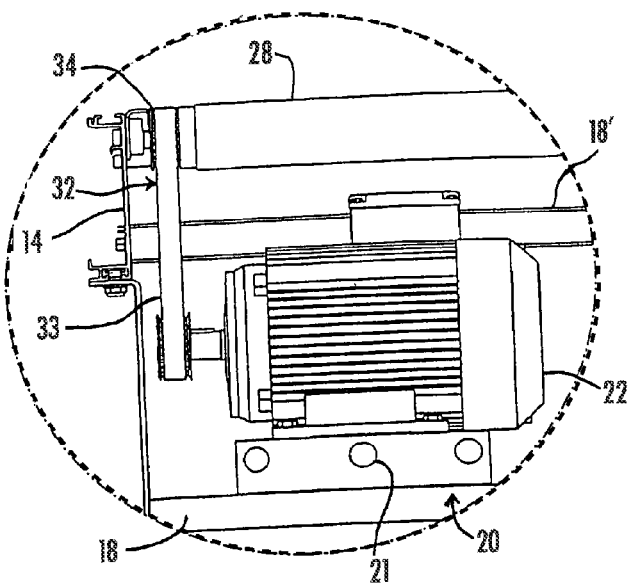
FIG. 5 is a partial end elevation of the belt conveyor in FIG. 4.

Motor 22 and rotary power transmission device 32 are operable to drive removable belt module 12 (FIGS. 5 and 6) or a traditional fixed belt module (not shown). Motor 22 is adjustably supported by adjustment mechanism 20, which is supported by frame 16, such as at cross member 18. Motor 22 is connected to drive pulley 24 via rotary power transmission device 32, which can be an endless belt (cog belt 33, shown), a chain, a driveshaft, a gear train, or the like. In the illustrated embodiment, drive pulley 24 is depicted as having a cog pulley 34 (FIGS. 3B and 6) attached thereon, to which cog belt 33 transmits power from motor 22 to drive pulley 24. Continuous belt 28 is reeved around drive pulley 24 and other pulley 26. In the illustrated embodiment, other pulley 26 is rotatably supported by pivot arm 38, which is pivotally supported by removable belt module frame 30. Other pulley 26 has a spindle 46 that is held fixed relative to pivot arm 38 by a clamp member 48 and a pair of fasteners 50 connecting clamp member 48 to pivot arm 38 (FIGS. 6-13).

As shown in FIG. 3A, one or both of drive pulley 24 and other pulley 26 (other pulley 26, shown) has a cylindrical outer surface 26a that may be formed with at least one crown or bump 26b along the pulley. Crowns 26b assist in tracking belt 28 during operation of belt conveyor 10. The use of crowns 26b in combination with a belt having a low modulus characteristic to track belt 28 is disclosed in commonly assigned U.S. Pat. No. 6,811,018, the disclosure of which is hereby incorporated herein by reference. Furthermore, drive pulley 24 may be lagged to create a high friction interface between drive pulley 24 and continuous belt 28 to drive belt 28 without slipping, and belt 28 preferably has a width that spans substantially across the space between sidewalls 14.

Each zone assembly 12 may further include adjustment mechanism 20, such as a jackscrew 21, to temporarily move a motor axis 22' closer to a drive pulley axis 24' to adjust the tension on belt 33 so that cog belt 33 can be removed from drive pulley 24, thus freeing removable belt module 12 from motor 22 (FIG. 4). For embodiments in which a mechanism is desirable to move motor axis 22' closer to drive pulley axis 24' so that cog belt 33 can be removed, any mechanism that allows a rigid body to translate in at least one plane, while being temporarily fixable in at least one position, can provide that functionality. Jackscrew 21 is just one example of adjustment mechanism 20, where other examples might include a T-pin and channel slider or a pivot arm device (not shown).

Alternative embodiments of the invention may be envisioned in which no adjustable motor mount is required, such as where the drive pulley comprises a motorized pulley. Another alternative embodiment that may not require an adjustable motor mount includes a gear train, or a splined shaft and gear train, as the rotary power transmission device. Yet another such alternative embodiment uses a drive pulley pivotally attached to either a removable belt module or a traditional fixed belt module such that the drive pulley's axis can be moved closer to the motor axis. Another such alternative embodiment uses a take-up assembly between the motor and drive pulley, and is disclosed in commonly assigned U.S. Pat. No. 6,860,383, the disclosure of which is hereby incorporated herein by reference.

While motor 22 is depicted herein as an electric motor located below removable belt module 12 and connected to drive pulley 24 via cog belt 33, it will be appreciated that motor 22 represents any source of rotational power, whether separate from or internal to drive pulley 24, including an AC motor, a DC motor, a combustion engine, a hydraulic or pneumatic motor, or the like. Also, the motor may be internal to drive pulley 24, which is known in the art as a motorized pulley or motorized roller, as disclosed in commonly assigned U.S. Pat. No. 6,811,018.

Referring now to FIGS. 8-11, over-center pivot arm 39 allows slack or tension to be imparted to continuous belt 28 when belt 28 is supported by either removable belt module 12 or traditional fixed belt module (not shown). Two pivot aims 38 are typically employed at either drive pulley 24 or other pulley 26, with one pivot arm 38 located at each end of the respective pulley. It is possible that a minimum of one pivot arm 38 could achieve the desired function. By moving pivot arms 38 such that the distance between drive pulley axis 24' and other pulley axis 26' is increased, continuous belt 28 is placed under tension such that belt conveyor 10 can be operated without belt 28 slipping on drive pulley 24 (see FIGS. 2, 4, and 6-9).

Figure 8:
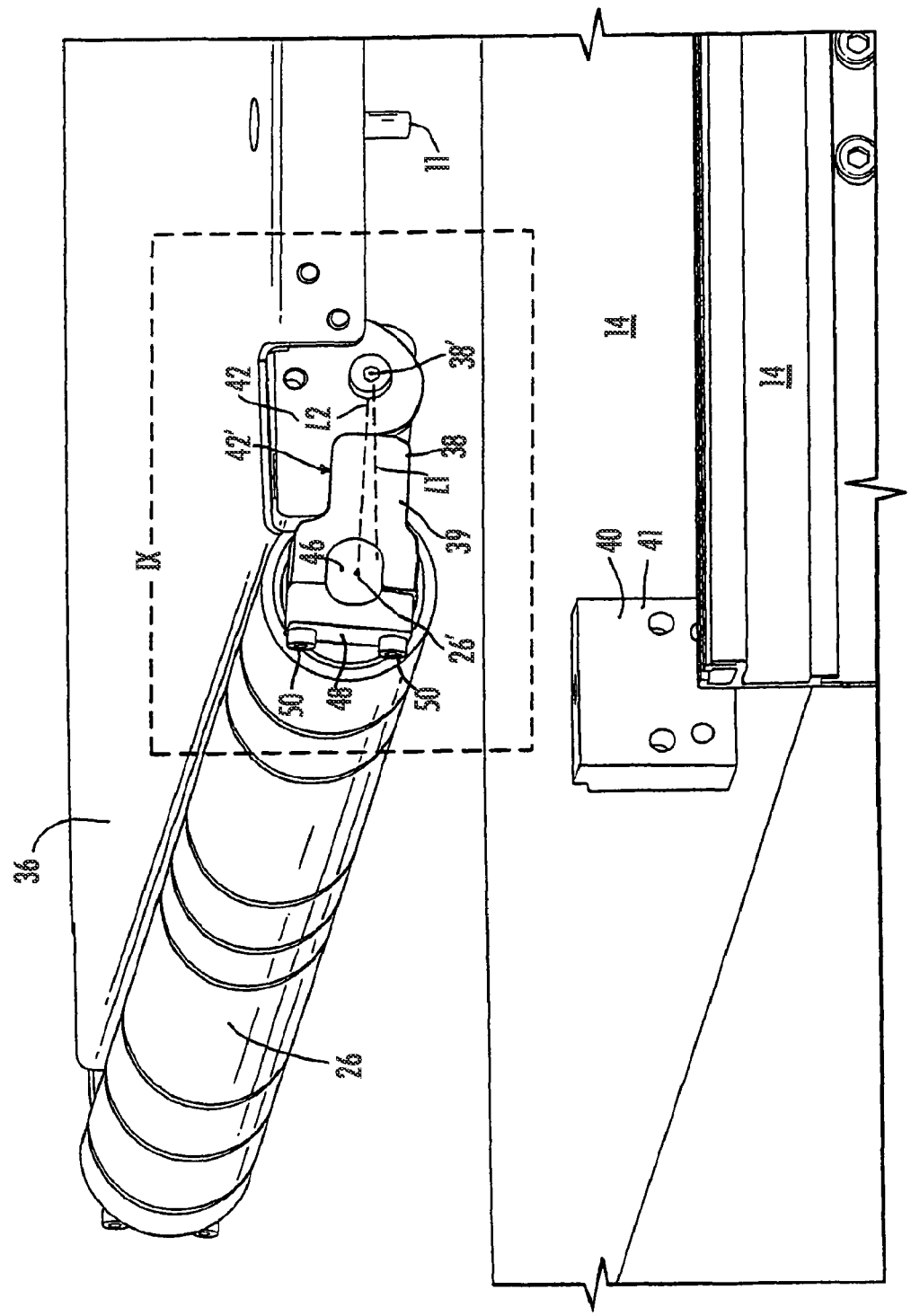
FIG. 8 is a perspective view of the belt conveyor in FIG. 1 showing the other pulley in its operating position, and taken from the top and an opposite end thereof.
Figure 9:
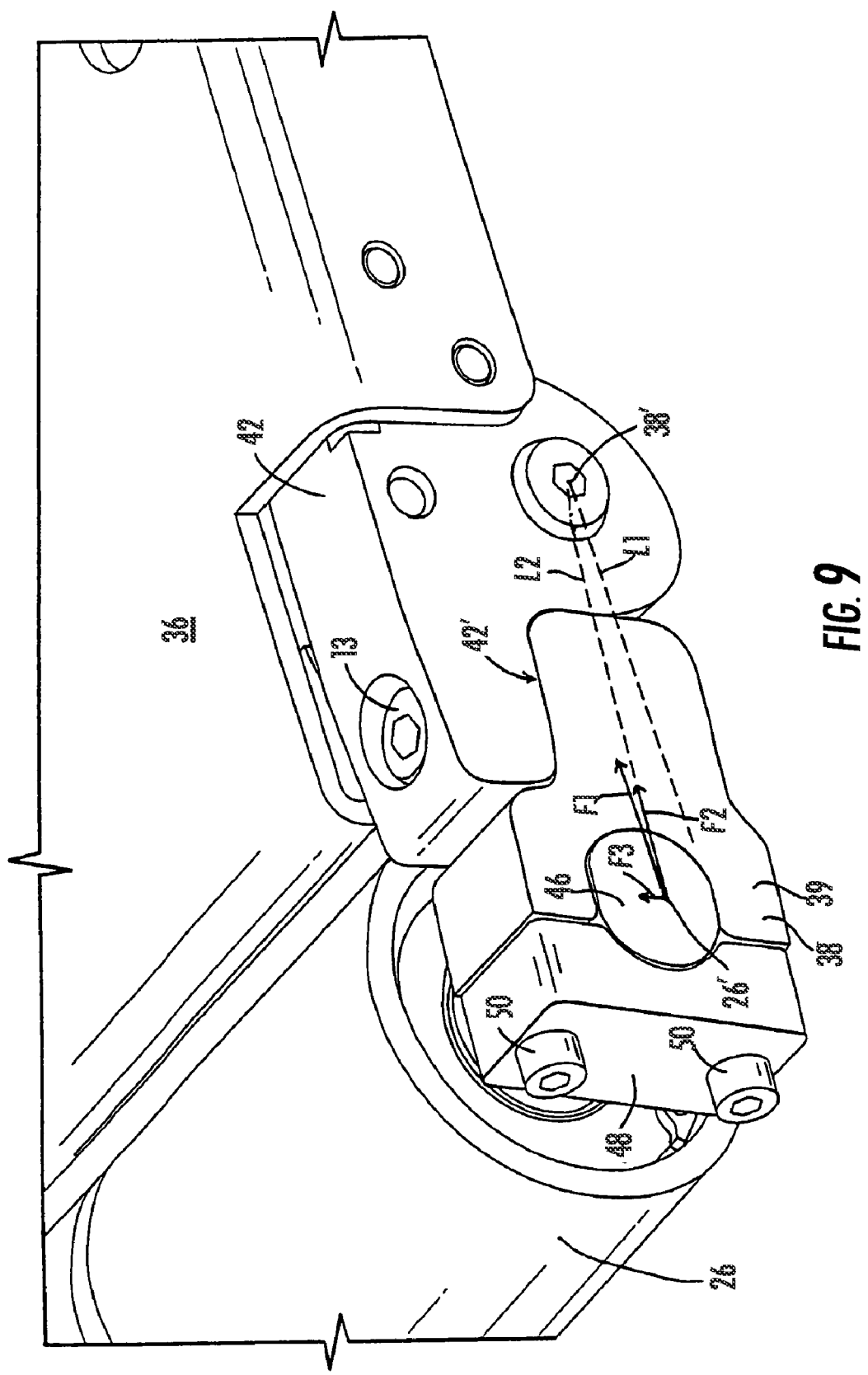
FIG. 9 is an enlarged perspective view of the area designated 'IX' in FIG. 8.
Figure 10:
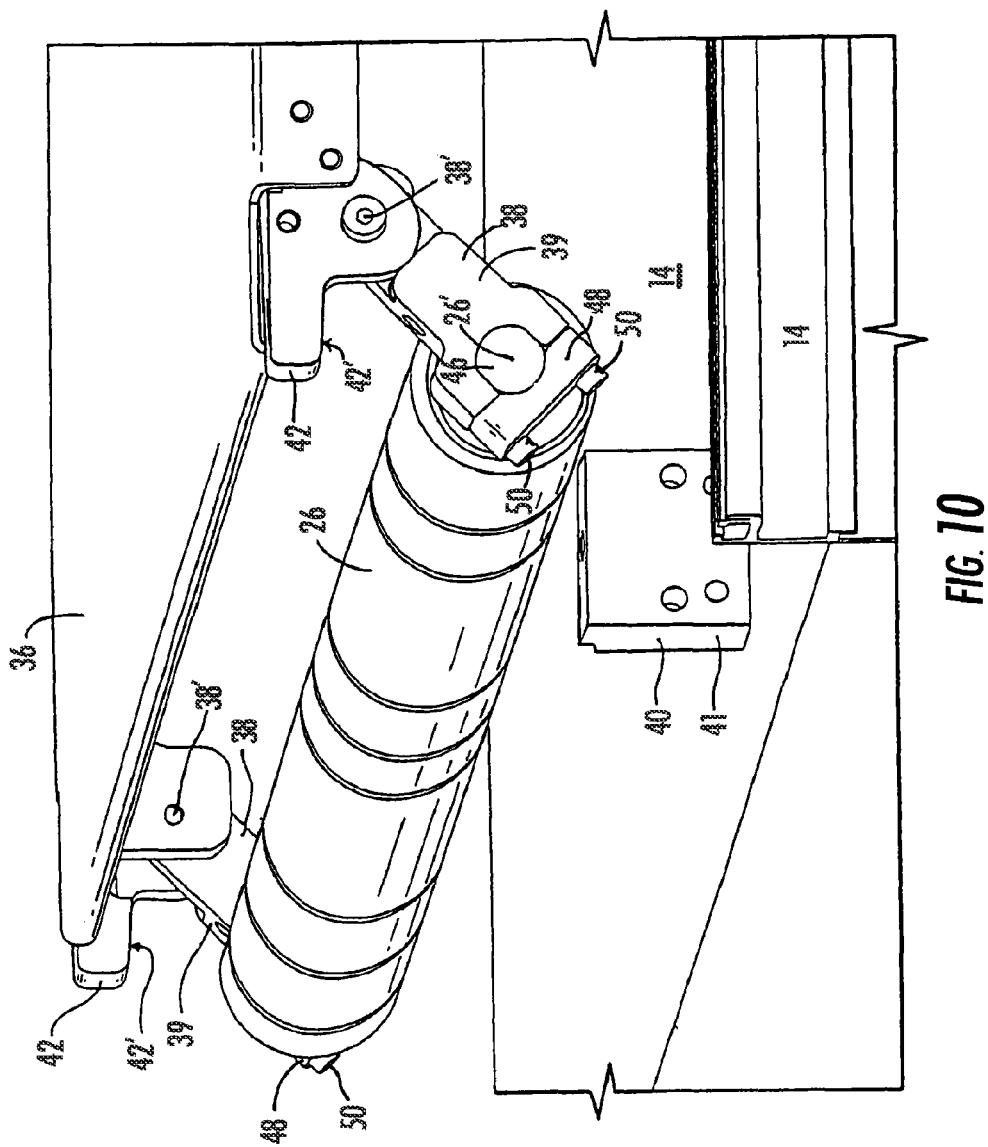
FIG. 10 is the same view as FIG. 8 showing the other pulley between its operating position and its maintenance position.
Figure 11:
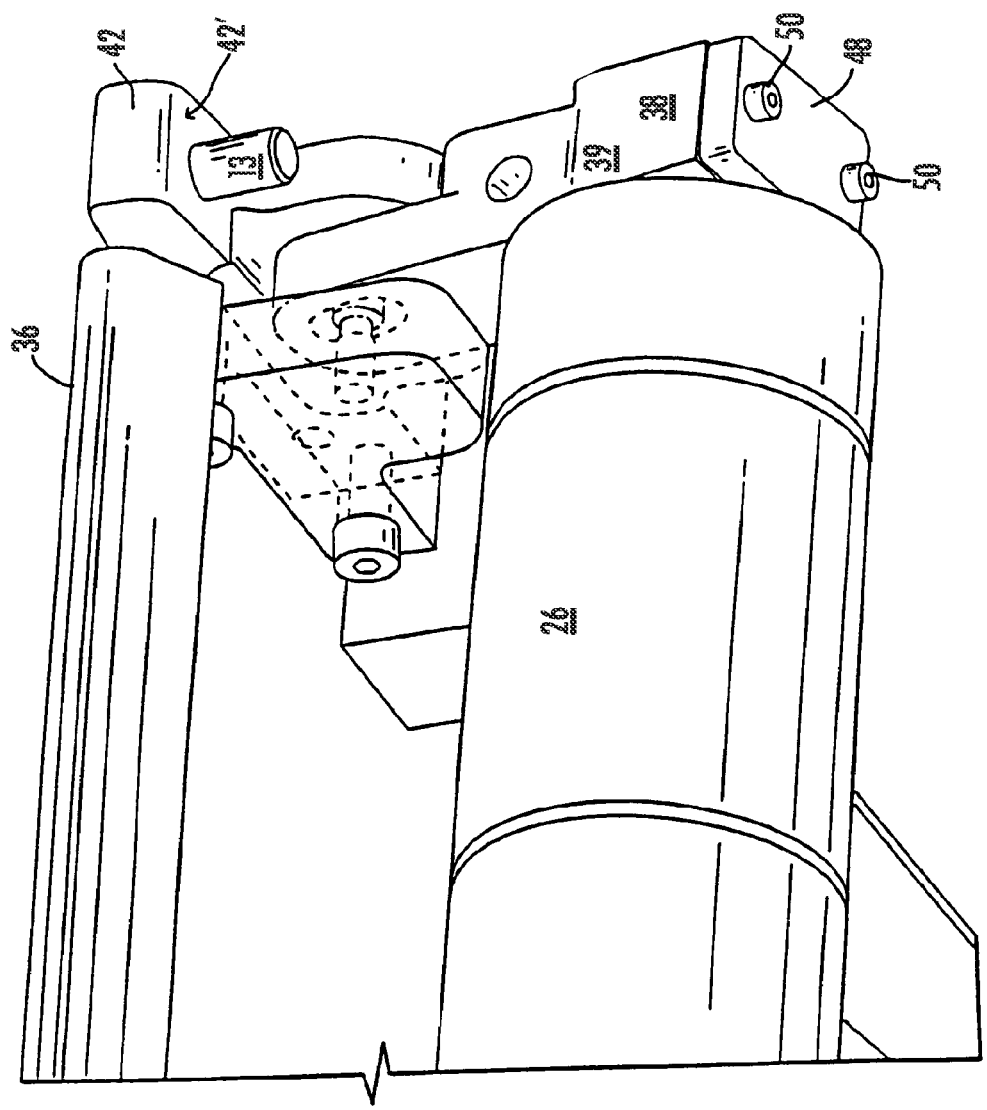
FIG. 11 is a perspective view of the removable belt module in FIG. 2 showing the other pulley in its maintenance position, and taken from the bottom and end thereof.

Depending on the configuration of pivot arms 38, a fastener 13 may be used to fix pivot aims 38 in an operating position (FIGS. 9 and 11). By moving pivot arms 38 to the maintenance position such that the distance between drive pulley axis 24' and other pulley axis 26' is decreased (see FIGS. 10 and 11), enough slack is imparted to continuous belt 28 such that belt 28 can be removed from removable belt module 12 or traditional fixed belt module (not shown) by sliding continuous belt 28 off of drive pulley 24 and other pulley 26. With pivot aims 38 in this position (FIGS. 10 and 11), a replacement belt 28 may be installed and later made taut by moving the pivot arms 38 to the operating position to increase the distance between pulley axes 24' and 26' (FIGS. 7-9).

In another embodiment of the invention, pivot arms 38 are configured as over-center pivot arms 39 (see FIGS. 8-11). In the over-center configuration, over-center pivot aims 39 cause maximum tension to be imparted to an installed belt 28 when a line L2 drawn from pivot axis 38' to the respective pulley axis, 26'or 24', is collinear with a line L1 drawn from drive pulley axis 24' to other pulley axis 26' (the "center" position). FIG. 4 shows pivot arm 38 in the center position, while FIGS. 8, 9, and 13 show lines L1, L2 at over-center pivot arm 39. One or more stop members 42 can be used to allow pivot arms 39 to pivot past this center position (i.e., "over-center") and come to rest against stop surfaces 42' while still maintaining sufficient tension in continuous belt 28 so that belt 28 can be driven by drive pulley 24, and pivot arms 39 are held in the operating position (FIGS. 8-10 and 13). Though the pivot arms' 39 over-center position is stable with a continuous belt 28 installed, the illustrative embodiment depicts a fastener 13 (FIGS. 9, 11, and 13) employed to further fix pivot arms 39 in their over-center operating position.

The over-center position is stable because belt tension exerts a force F1 on other pulley 26, where force F1 acts in a direction parallel to line L1 and at a non-zero angle θ relative to line L2 (FIG. 9). Therefore, force F1 has a component F2 in the direction parallel to L2, and also a component F3 in the direction perpendicular to L2. Force component F3 thus urges pivot arm 39 into contact with stop surface 42' of stop member 42. It will be appreciated that pivot arms 38 (FIG. 4) provide substantially the same function as over-center pivot arms 39, but the configuration does not exhibit a vertical force component to hold pivot arms 38 in their operating position.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A method of replacing a continuous belt on a belt conveyor, said belt conveyor including a frame assembly, said method comprising:
   (a) providing at least one removable belt module having a removable belt module frame, said removable belt module frame having at one end a rotatably mounted drive pulley and having at an opposite end a rotatably mounted other pulley, said continuous belt reeved around said drive pulley and said other pulley, said drive pulley interconnected with a motor mounted to said frame assembly via a power transmission device, and said frame assembly defining at least one attachment surface;
   (b) removing said removable belt module from said attachment surface, wherein said continuous belt remains under tension upon removal of said removable belt module from said attachment surface, and wherein said removing said removable belt module comprises disconnecting said power transmission device; and
   (c) placing a replacement removable belt module at said at least one attachment surface.

2. The method of claim 1, further comprising:
   (a) providing a pivot arm on at least one of said drive pulley and said at least one other pulley to maintain tension on said continuous belt;
   (b) after removing said removable belt module from said at least one attachment surface, moving said pivot arm out of an operating position and into a maintenance position such that said pulleys release said belt tension;
   (c) removing said continuous belt from said drive pulley and said other pulley;
   (d) reeving a replacement continuous belt around said drive pulley and said other pulley; and
   (e) moving said pivot arm back into said operating position such that said pulleys impart tension on said continuous belt.

3. The method of claim 2, wherein said pivot arm comprises an over-center pivot arm and wherein said continuous belt comprises a low modulus characteristic.

4. The method of claim 3, wherein said moving said pivot arm out of said operating position and into said maintenance position comprises initially moving said pivot arm against the tension of said continuous belt to stretch said continuous belt, and wherein said moving said pivot arm back into said operating position comprises moving said pivot arm against the tension of said continuous belt to stretch said continuous belt.

5. The method of claim 3, including retaining said pivot arm in said operating position with the tension of said continuous belt.

6. The method of claim 5, including further retaining said pivot arm in said operating position with a fastener, wherein said moving said pivot arm out of said operating position and into said maintenance position comprises removing said fastener before moving said pivot arm against the tension of said continuous belt, and wherein said moving said pivot arm back into said operating position comprises replacing said fastener after.

7. The method of claim 1, wherein said removing said belt module comprises removing said removable belt module from said at least one attachment surface in a substantially vertical direction.

8. The method of claim 1, wherein said placing said replacement removable belt module comprises placing said replacement removable belt module in a substantially vertical direction.

9. The method of claim 1, wherein said placing said replacement removable belt module includes connecting said power transmission device between said motor and a replacement drive pulley of said replacement removable belt module.

10. The method of claim 1, wherein said replacement removable belt module comprises said removable belt module having a replacement continuous belt reeved around said pulleys.

11. A method of replacing a continuous belt on a belt conveyor, said belt conveyor including a frame assembly, said method comprising:
(a) providing at least one removable belt module having a removable belt module frame, said removable belt module frame having at one end a rotatably mounted motorized drive pulley and having at an opposite end a rotatably mounted other pulley, said continuous belt reeved around said motorized drive pulley and said other pulley, and said frame assembly defining at least one attachment surface;
(b) removing said removable belt module from said attachment surface, wherein said continuous belt remains under tension upon removal of said removable belt module from said attachment surface; and
(c) placing a replacement removable belt module at said at least one attachment surface.

12. The method of claim 11, further comprising:
(a) providing a pivot arm on at least one of said motorized drive pulley and said at least one other pulley to maintain tension on said continuous belt;
(b) after removing said removable belt module from said at least one attachment surface, moving said pivot arm out of an operating position and into a maintenance position such that said pulleys release said belt tension;
(c) removing said continuous belt from said motorized drive pulley and said other pulley;
(d) reeving a replacement continuous belt around said motorized drive pulley and said other pulley; and
(e) moving said pivot arm back into said operating position such that said pulleys impart tension on said continuous belt.

13. The method of claim 12, wherein said pivot arm comprises an over-center pivot arm and wherein said continuous belt comprises a low modulus characteristic.

14. The method of claim 13, wherein said moving said pivot arm out of said operating position and into said maintenance position comprises initially moving said pivot arm against the tension of said continuous belt to stretch said continuous belt, and wherein said moving said pivot arm back into said operating position comprises moving said pivot arm against the tension of said continuous belt to stretch said continuous belt.

15. The method of claim 13, including retaining said pivot arm in said operating position with the tension of said continuous belt.

16. The method of claim 15, including further retaining said pivot arm in said operating position with a fastener, wherein said moving said pivot arm out of said operating position and into said maintenance position comprises removing said fastener before moving said pivot arm against the tension of said continuous belt, and wherein said moving said pivot arm back into said operating position comprises replacing said fastener after.

17. The method of claim 11, wherein said removing said belt module comprises removing said removable belt module from said at least one attachment surface in a substantially vertical direction.

18. The method of claim 11, wherein said placing said replacement removable belt module comprises placing said replacement removable belt module in a substantially vertical direction.

19. The method of claim 11, wherein said replacement removable belt module comprises said removable belt module having a replacement continuous belt reeved around said pulleys.

* * * * *